(12) United States Patent
Weyer et al.

(10) Patent No.: US 11,753,093 B2
(45) Date of Patent: Sep. 12, 2023

(54) SUSPENSION SYSTEM FOR A TRACK-DRIVEN WORK VEHICLE WITH PIVOTING ROLLER WHEEL ASSEMBLIES

(71) Applicant: CNH Industrial America LLC, New Holland, PA (US)

(72) Inventors: Jason Edward Weyer, Fargo, ND (US); Brian Vik, Barnesville, MN (US); Daniel J. Zurn, Horace, ND (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 724 days.

(21) Appl. No.: 16/843,195

(22) Filed: Apr. 8, 2020

(65) Prior Publication Data
US 2020/0324837 A1 Oct. 15, 2020

Related U.S. Application Data

(60) Provisional application No. 62/831,256, filed on Apr. 9, 2019.

(51) Int. Cl.
*B62D 55/104* (2006.01)
*B62D 55/14* (2006.01)
*B62D 55/108* (2006.01)
*B62D 55/12* (2006.01)
*B62D 55/065* (2006.01)

(52) U.S. Cl.
CPC ....... *B62D 55/104* (2013.01); *B62D 55/1086* (2013.01); *B62D 55/12* (2013.01); *B62D 55/14* (2013.01); *B62D 55/065* (2013.01)

(58) Field of Classification Search
CPC ... B62D 55/104; B62D 55/1086; B62D 55/12
See application file for complete search history.

(56) References Cited

U.S. PATENT DOCUMENTS

| | | | |
|---|---|---|---|
| 1,506,431 | A | 8/1924 | Kegresse |
| 1,513,144 | A | 10/1924 | Wellman |
| 2,467,947 | A | 4/1949 | Skelton |
| 2,541,943 | A | 2/1951 | Sherman |

(Continued)

FOREIGN PATENT DOCUMENTS

| | | |
|---|---|---|
| CA | 2479388 | 3/2006 |
| CN | 2395948 | 9/2000 |

(Continued)

OTHER PUBLICATIONS

US 9,783,249 B2, 10/2017, Eavenson, Sr. et al. (withdrawn)

(Continued)

*Primary Examiner* — Jacob D Knutson
(74) *Attorney, Agent, or Firm* — Rickard DeMille; Rebecca Henkel (57) ABSTRACT

An improved suspension system for a track-driven work vehicle includes a roller beam and at least one roller wheel assembly coupled to the roller beam. The roller wheel assembly includes an inboard roller shaft, an inboard roller wheel coupled to the inboard roller shaft, an outboard roller shaft, and an outboard roller wheel coupled to the outboard roller shaft. Additionally, the roller wheel assembly includes a pivot mechanism coupling the inboard roller shaft to the outboard roller shaft.

18 Claims, 4 Drawing Sheets

(56) References Cited

U.S. PATENT DOCUMENTS

| | | |
|---|---|---|
| 3,446,302 A | 5/1969 | Schoonover |
| 3,447,620 A | 6/1969 | Schoonover |
| 3,504,753 A | 4/1970 | Rutley |
| 3,603,423 A | 9/1971 | Schoonover |
| 3,613,810 A | 10/1971 | Hetteen |
| 3,658,145 A | 4/1972 | Bergmann et al. |
| 3,758,169 A | 9/1973 | Trapp |
| 3,841,424 A | 10/1974 | Purcell et al. |
| 3,861,762 A | 1/1975 | Freedy et al. |
| 3,938,606 A | 2/1976 | Yancey |
| 4,043,417 A | 8/1977 | Orpana |
| 4,120,372 A | 10/1978 | Hartwich |
| 4,279,318 A | 7/1981 | Meisel, Jr. |
| 4,351,572 A | 9/1982 | Fujiwara |
| 4,462,480 A | 7/1984 | Yasui et al. |
| 4,519,654 A | 5/1985 | Satzler et al. |
| 4,582,367 A | 4/1986 | Jacquet et al. |
| 4,647,116 A | 3/1987 | Trask |
| 4,681,177 A | 7/1987 | Zborowski |
| 4,708,218 A | 11/1987 | Makela |
| 4,819,754 A | 4/1989 | Purcell et al. |
| 4,923,527 A | 5/1990 | Ludwigson |
| 5,031,973 A | 7/1991 | Gillet |
| 5,293,948 A | 3/1994 | Crabb |
| 5,316,381 A | 5/1994 | Isaacson et al. |
| 5,409,075 A | 4/1995 | Nieman |
| 5,452,949 A | 9/1995 | Kelderman |
| 5,456,331 A | 10/1995 | Gustin et al. |
| 5,566,773 A | 10/1996 | Gersmann |
| 5,622,234 A | 4/1997 | Nagorcka et al. |
| 5,692,579 A | 12/1997 | Peppel et al. |
| 5,829,848 A | 11/1998 | Kelderman |
| 5,873,640 A | 2/1999 | Oertley |
| 5,899,542 A | 5/1999 | Lykken et al. |
| 5,899,543 A | 5/1999 | Lykken et al. |
| 5,997,109 A | 12/1999 | Kautsch |
| 6,006,847 A | 12/1999 | Knight |
| 6,007,166 A | 12/1999 | Tucker et al. |
| 6,112,840 A | 9/2000 | Forbes |
| 6,135,220 A | 10/2000 | Gleasman et al. |
| 6,283,562 B1 | 9/2001 | Tsubota et al. |
| 6,302,232 B1 | 10/2001 | Forbes |
| 6,318,484 B2 | 11/2001 | Lykken et al. |
| 6,382,338 B1 | 5/2002 | Forbes |
| 6,390,219 B1 | 5/2002 | Vaisanen |
| 6,431,301 B1 | 8/2002 | Forbes |
| 6,435,292 B2 | 8/2002 | Lemke |
| 6,585,286 B2 | 7/2003 | Adema et al. |
| 6,607,256 B2 | 8/2003 | Yoshida |
| 6,615,939 B1 | 9/2003 | Karales |
| 6,626,258 B1 | 9/2003 | Forbes |
| 6,733,093 B2 | 5/2004 | Deland et al. |
| 6,904,986 B2 | 6/2005 | Brazier |
| 6,951,260 B1 | 10/2005 | Isley |
| RE38,858 E | 11/2005 | Grawey et al. |
| 7,131,507 B2 | 11/2006 | Wenger |
| 7,131,508 B2 | 11/2006 | Brazier |
| 7,296,862 B2 | 11/2007 | Albright et al. |
| 7,380,892 B2 | 6/2008 | Rosenboom |
| 7,478,688 B2 | 1/2009 | Ki |
| 7,533,741 B2 | 5/2009 | Brazier |
| 7,552,785 B2 | 6/2009 | Tuhy |
| 7,597,161 B2 | 10/2009 | Brazier |
| 7,628,235 B2 | 12/2009 | Satzler et al. |
| 7,690,738 B2 | 4/2010 | Wilt |
| 7,712,557 B2 | 5/2010 | Duceppe |
| 7,726,749 B2 | 6/2010 | Rosenboom |
| 7,740,084 B2 | 6/2010 | Rosenboom |
| 7,832,508 B2 | 11/2010 | Isley |
| 7,862,131 B2 | 1/2011 | Poirier |
| 7,870,914 B2 | 1/2011 | Todd et al. |
| 7,967,087 B2 | 6/2011 | Arulraja et al. |
| 8,056,655 B2 | 11/2011 | Mallette et al. |
| 8,118,374 B2 | 2/2012 | Canossa |
| 8,147,007 B2 | 4/2012 | Rainer |
| 8,157,335 B2 | 4/2012 | Poirier |
| 8,342,257 B2 | 1/2013 | Rosenboom |
| 8,347,991 B2 | 1/2013 | Zuchoski et al. |
| 8,607,903 B2 | 12/2013 | Godin et al. |
| 8,636,326 B2 | 1/2014 | Inaoka |
| 8,708,069 B2 | 4/2014 | Allaire |
| 8,727,047 B2 | 5/2014 | Janzen et al. |
| 8,763,716 B2 | 7/2014 | Rosenboom |
| 8,851,209 B2 | 10/2014 | Fukumoto |
| 8,851,581 B2 | 10/2014 | Marchildon et al. |
| 8,875,816 B2 | 11/2014 | Steltz et al. |
| 8,955,925 B2 | 2/2015 | Bessette et al. |
| 9,051,009 B2 | 6/2015 | Prohaska |
| 9,290,216 B2 | 3/2016 | Fairhead |
| 9,359,021 B2 | 6/2016 | Janzen et al. |
| 9,394,015 B2 | 7/2016 | Cox |
| 9,415,817 B2 | 8/2016 | Rackow et al. |
| 9,415,818 B1 | 8/2016 | Tiede et al. |
| 9,434,426 B2 | 9/2016 | Nagorcka et al. |
| 9,440,691 B2 | 9/2016 | Rosenboom |
| 9,457,854 B2 | 10/2016 | Van Mill et al. |
| 9,586,642 B2 | 3/2017 | Mori |
| 9,604,682 B2 | 3/2017 | Marchildon et al. |
| 9,663,164 B2 | 5/2017 | Vik et al. |
| 9,764,784 B2 | 9/2017 | Brazier |
| 9,828,047 B2 | 11/2017 | Eavenson, Sr. et al. |
| 9,884,662 B2 | 2/2018 | Eavenson, Sr. et al. |
| 9,937,969 B2 | 4/2018 | Obermeier-Hartmann et al. |
| 9,950,756 B2 | 4/2018 | De Boe et al. |
| 9,963,177 B2 | 5/2018 | Marchildon et al. |
| 9,994,268 B2 | 6/2018 | Gustafson |
| 10,035,551 B2 | 7/2018 | Davis et al. |
| 10,059,391 B2 | 8/2018 | Kirchmair et al. |
| 10,065,690 B2 | 9/2018 | Summer et al. |
| 10,308,296 B2 | 6/2019 | Piens et al. |
| 10,597,098 B2 | 3/2020 | Vik et al. |
| 2001/0030068 A1 | 10/2001 | Nagorkca et al. |
| 2004/0119336 A1 | 6/2004 | Lussier |
| 2005/0046277 A1 | 3/2005 | Simons et al. |
| 2006/0254832 A1 | 11/2006 | Strong |
| 2008/0156548 A1 | 7/2008 | Mallette et al. |
| 2010/0059297 A1 | 3/2010 | Urbanik et al. |
| 2010/0237574 A1 | 9/2010 | Allaire |
| 2011/0309672 A1 | 12/2011 | Thorson |
| 2012/0090903 A1 | 4/2012 | Bessette et al. |
| 2013/0154345 A1 | 6/2013 | Schulz et al. |
| 2015/0217816 A1 | 8/2015 | Franck |
| 2015/0321711 A1 | 11/2015 | Vik |
| 2015/0329154 A1 | 11/2015 | Roy |
| 2016/0194038 A1 | 7/2016 | Jean |
| 2016/0355221 A1 | 12/2016 | Van Mill et al. |
| 2016/0362150 A1 | 12/2016 | Kirchmair et al. |
| 2017/0036714 A1* | 2/2017 | Lunkenbein ........... B62D 55/14 |
| 2017/0225727 A1 | 8/2017 | Sauvageau et al. |
| 2017/0291652 A1 | 10/2017 | Marchildon et al. |
| 2018/0009490 A1 | 1/2018 | Sauvageau et al. |
| 2018/0022408 A1 | 1/2018 | Sauvageau et al. |
| 2018/0086397 A1 | 3/2018 | Sauvageau et al. |
| 2018/0118291 A1 | 5/2018 | Sauvageau et al. |
| 2018/0162464 A1 | 6/2018 | Eavenson et al. |
| 2018/0162465 A1 | 6/2018 | Visscher et al. |

FOREIGN PATENT DOCUMENTS

| | | |
|---|---|---|
| CN | 2752135 | 1/2006 |
| CN | 101138992 B | 10/2013 |
| CN | 203681264 U | 7/2014 |
| CN | 104691633 A | 6/2015 |
| CN | 204567824 U | 8/2015 |
| CN | 106494521 A | 3/2017 |
| CN | 103770634 B | 6/2017 |
| CN | 107531294 A | 1/2018 |
| DE | 2949942 | 12/1979 |
| DE | 19919959 | 11/2000 |
| DE | 202004020124 U1 | 4/2005 |
| DE | 202010009744 U1 | 11/2010 |
| EP | 2574526 A2 | 4/2013 |
| GB | 2301569 B | 5/1999 |
| JP | H09240526 | 9/1997 |

(56) References Cited

FOREIGN PATENT DOCUMENTS

| | | | |
|---|---|---|---|
| JP | H09267779 | | 10/1997 |
| JP | 2000006857 | | 1/2000 |
| JP | 2000027881 | A * | 1/2000 |
| JP | 2010052549 | | 3/2010 |
| RU | 2446974 | C2 | 4/2012 |
| SU | 1691210 | | 11/1991 |
| WO | WO1997/036778 | | 10/1997 |
| WO | WO2014/022042 | | 2/2014 |
| WO | WO2014/022043 | | 2/2014 |
| WO | WO2016/080577 | | 5/2016 |
| WO | WO2017/078980 | | 5/2017 |
| WO | WO2018/024762 | | 2/2018 |
| WO | WO2018/024766 | | 2/2018 |

OTHER PUBLICATIONS

Peter Hill, "Soft-Shoe Shuffle." iVT International Industrial Vehicle Technology Magazine, Jun./Jul. 2011, p. 26-30.
Peter Hill, "Wheels Vs. Tracks." iVT International Industrial Vehicle Technology Magazine, May/Jun. 2008. p. 32-38.
Track Suspension, ScoutBot 1402 (an Outdoor Robot), Let's Make Robots! RobotShop, dated May 15, 2012, retireved Aug. 31, 2018 (pp. 1-10). https://www.robotstop.com/letsmakerobots/scoutbot-1402-outdoor-robot?page=1.

\* cited by examiner

SUSPENSION SYSTEM FOR A TRACK-DRIVEN WORK VEHICLE WITH PIVOTING ROLLER WHEEL ASSEMBLIES

CROSS-REFERENCE TO RELATED APPLICATIONS

The present application is based upon and claims the right of priority to U.S. Provisional Patent Application No. 62/831,256, filed Apr. 9, 2019, the disclosure of which is hereby incorporated by reference herein in its entirety for all purposes.

FIELD OF THE INVENTION

The present subject matter relates generally to track-driven work vehicles and, more particularly, to a suspension system for a track assembly of a track-driven work vehicle that includes one or more pivoting roller wheel assemblies.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For instance, for a four-wheel drive track-driven vehicle, a drive wheel of each front track assembly is typically rotationally coupled to a front axle assembly of the work vehicle for transferring torque transmitted from the engine to the front track assembly, while a drive wheel of each rear track assembly is typically rotationally coupled to a rear axle assembly of the work vehicle for transferring torque transmitted from the engine to the rear track assembly. As is generally understood, each drive wheel may be configured to rotationally engage a corresponding endless track of the associated track assembly such that rotation of the drive wheel rotates the track, thereby allowing the vehicle to be driven forward or backward.

Each track assembly is typically associated with a suspension system having one or more undercarriage support beams. The undercarriage support beam(s) is used to support the vehicle above various load bearing wheels (e.g., roller wheels), which roll on the endless track as the work vehicle traverses a field or other driving surface. For most suspension systems, it is desirable to distribute the weight of the work vehicle across the load bearing wheels to reduce the stresses acting on the track that may otherwise decrease track longevity due to overheating or other weight overload issues, as well as to maintain the endless track in contact with the ground. To allow for such weight distribution across the load bearing wheels, systems must be developed that are designed to dampen movement of one or more system components relative to the other components of the suspension system. Such motion damping not only allows for more even weight distribution and improved track-to-ground contact, but also limits the amount of vibrations transmitted between the track assembly and the vehicle's chassis, thereby increasing the smoothness of the ride and, thus, the operator's comfort level.

To date, various suspension systems have been developed for track assemblies that attempt to provide desired track performance. However, such conventional suspension systems still lack the capability of providing the desired amount of motion damping between the various track components, particularly sufficient vertical damping to accommodate large bumps and/or other significant variations in the ground surface profile Accordingly, an improved suspension system for use with a track assembly of a track-driven work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a suspension system configured in accordance with one or more embodiments disclosed herein.

In another aspect, the present subject matter is directed to a suspension system for a track assembly of a track driven work vehicle. The suspension system includes a roller beam and at least one roller wheel assembly coupled to the roller beam. The roller wheel assembly includes an inboard roller shaft, an inboard roller wheel coupled to the inboard roller shaft, an outboard roller shaft, and an outboard roller wheel coupled to the outboard roller shaft. In addition, the roller wheel assembly includes a pivot mechanism coupling the inboard roller shaft to the outboard roller shaft.

In a further aspect, the present subject matter is directed to a track assembly for a track driven work vehicle. The track assembly includes a track, a drive wheel configured to engage the track, and front and rear idler wheels around which the track is wrapped. The track assembly also includes a main undercarriage support beam relative to which the front and rear idler wheels are supported, a roller beam suspended relative to the main undercarriage support beam, and at least one roller wheel assembly coupled to the roller beam. The roller wheel assembly includes an inboard roller shaft, an inboard roller wheel coupled to the inboard roller shaft, an outboard roller shaft, and an outboard roller wheel coupled to the outboard roller shaft. In addition, the roller wheel assembly includes a pivot mechanism coupling the inboard roller shaft to the outboard roller shaft. The inboard and outboard roller shafts are offset from each other and the pivot mechanism defines a pivot axis about which the inboard and outboard roller shafts pivot In yet another aspect, the present subject matter is directed to a track-driven work vehicle including a chassis and a track assembly supported relative to the chassis. The track assembly includes a track, a drive wheel configured to engage the track, a main undercarriage support beam coupled to the chassis, and front and rear idler wheel assemblies coupled to opposed ends of the main undercarriage support beam. In addition, the track assembly includes a roller beam suspended relative to the main undercarriage support beam and at least one roller wheel assembly coupled to the roller beam. The roller wheel assembly includes, an inboard roller shaft, an inboard roller wheel coupled to the inboard roller shaft, an outboard roller shaft, and an outboard roller wheel coupled to the outboard roller shaft. In addition, the roller wheel assembly includes a pivot mechanism coupling the inboard roller shaft to the outboard roller shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved suspension system for a track-driven work vehicle. Specifically, the suspension system includes one or more pivoting roller wheel assemblies that allow loads to be transferred between each pair of inboard and outboard roller wheels, thereby providing improved vertical motion damping to accommodate bumps and other ground contour changes.

In several embodiments, each roller wheel assembly includes an inboard roller wheel, an outboard roller wheel, and inboard and outboard roller shafts coupled to the inboard and outboard roller wheels, respectively. Additionally, in accordance with aspects of the present subject matter, each roller wheel assembly includes or is associated with a pivot joint that allows the roller wheels to pivot about a pivot axis defined by the pivot joint. In one embodiment, the pivot joint may be defined by a pivot mechanism that couples or connects the inboard pivot shaft to the outboard pivot shaft. The pivot mechanism may, in one embodiment, comprise a suitable bearing or bearing assembly, such as a spherical roller bearing or a tapered roller bearing. Moreover, in one embodiment, the inboard and outboard roller shafts are offset from each other in a travel direction of the related work vehicle, with the pivot mechanism being used to connect the offset roller shafts to each other.

Given the disclosed suspension arrangement, when one wheel of a given roller wheel assembly passes over a bump, a portion of the load may be transferred to the opposed wheel of the roller wheel assembly via the pivoting action provided by the pivot joint, which pushes down the opposed wheel to help "lift" the other wheel over the bump. This reduces the amount of loading on the wheel that is passing over the bump and can reduce the overall amount of shock loading on the vehicle.

Additionally, in one embodiment, the pivot axis defined by the pivot mechanism may be either parallel to the travel direction of the work vehicle or slightly offset from parallel. When offset from parallel, the pivoting action results in the opposed wheels pivoting not only vertically up/down, but also slightly forward/rearward in the travel direction and inward/outward relative to a longitudinal centerline of the suspension system.

It should be appreciated that the disclosed suspension system provides enhanced motion damping over conventional suspension systems, which can lead to more even weight distribution, better track-to-ground contact, and improved operator comfort. For example, the disclosed system may allow for the inboard and outboard wheels of each roller wheel assembly to pivot about a centralized pivot joint, thereby providing improved vertical compliance to accommodate large bumps and/or other significant variations the ground surface profile. As a result, a significant reduction in the amount of shock loading or vibrations transmitted from the track assembly to the operator's cab can be achieved.

Figure 1:
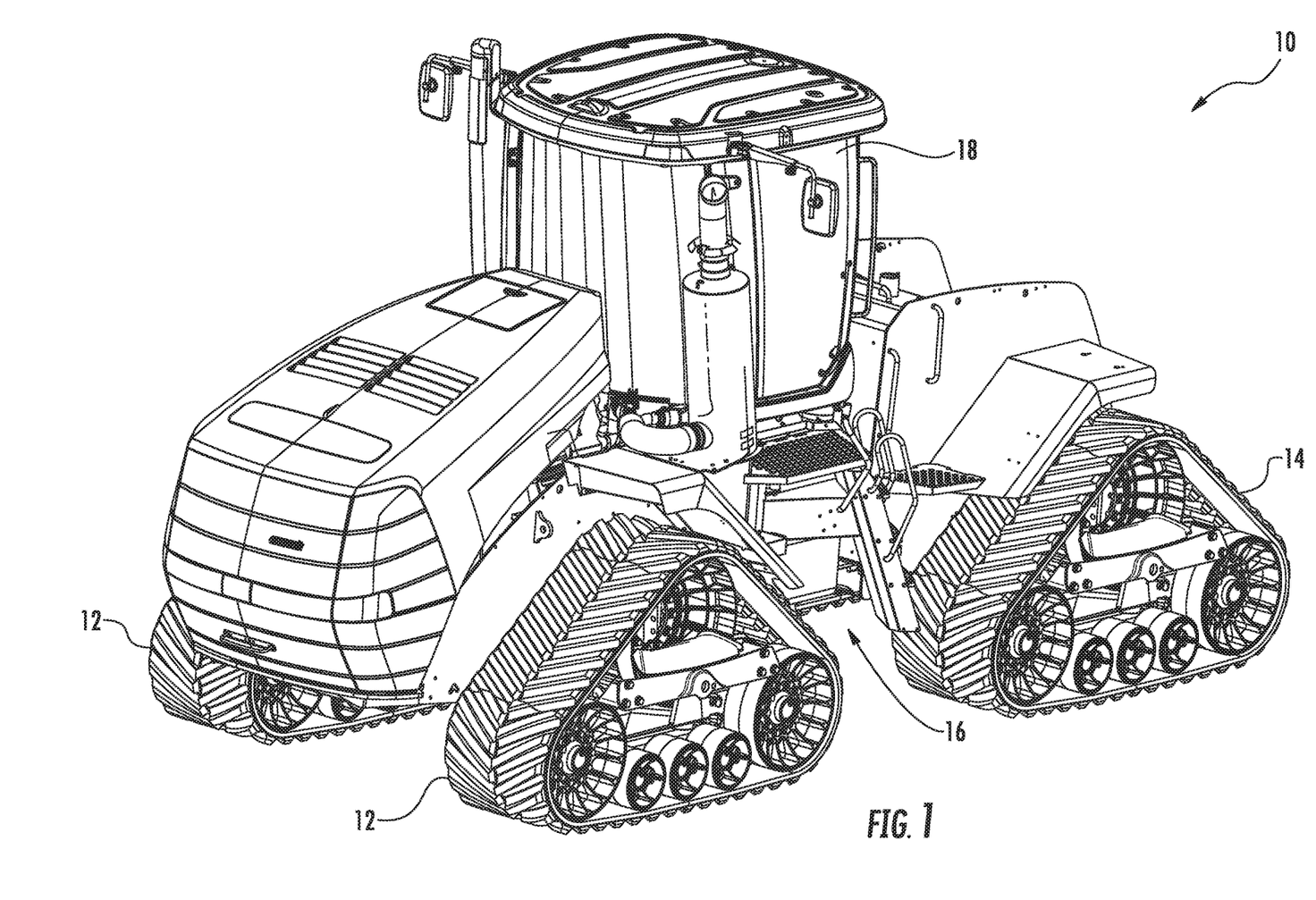
FIG. 1 illustrates a perspective view of one embodiment of a track-driven work vehicle in accordance with aspects of the present subject matter.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Figure 2:
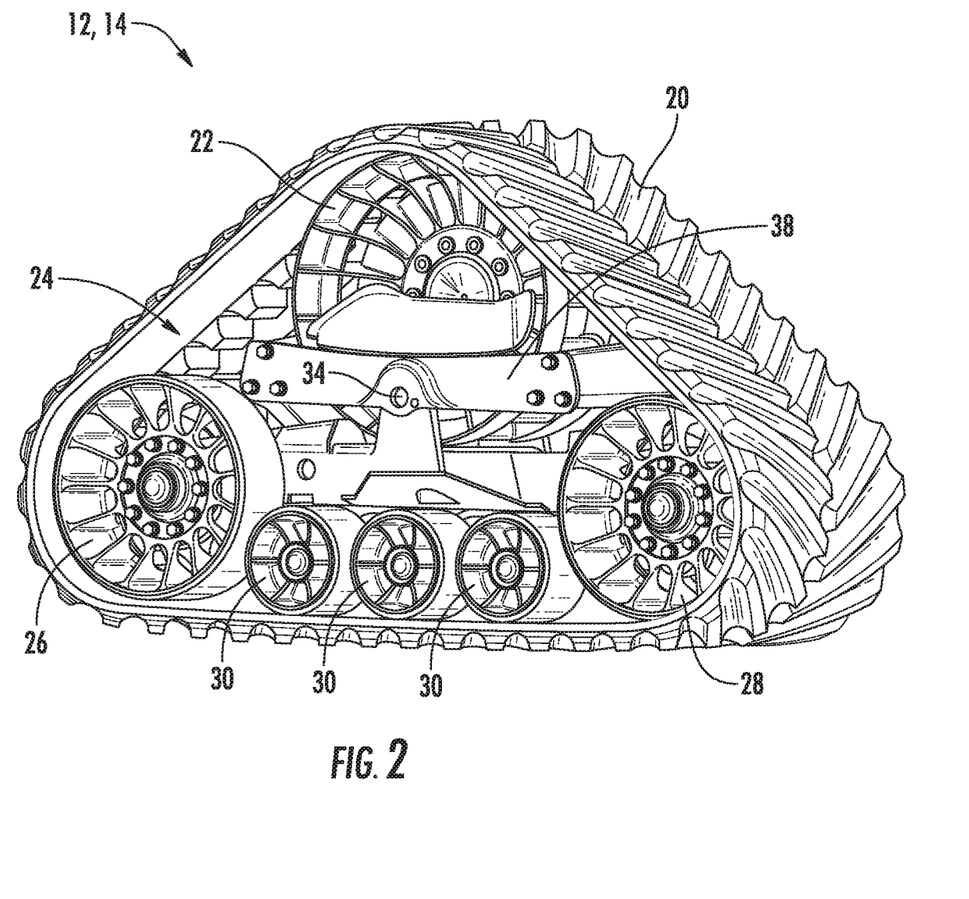
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the front track assemblies 12, 14 shown in FIG. 1 is illustrated in accordance with aspects of the present subject matter. As shown, the track assembly 12, 14 may generally include a track 20, a drive wheel 22 for mechanically engaging the track 20, and a suspension system 24 for supporting the weight of the work vehicle 10 and for damping vibrations and other movement between the track 20 and the vehicle's chassis 16. In one embodiment, the suspension system 24 may include front and rear idler wheel assemblies 26, 28 about which the track 20 is wrapped and a plurality of roller wheel assemblies 30 for guiding the track 20 between the idler wheel assemblies 26, 28. Additionally, the suspension system 24 may include one or more undercarriage support beams (not shown in FIG. 2) configured to support the idler wheel assemblies 26, 28 and the roller wheel assemblies 30 relative to the track 20.

In one embodiment, one or more components of the suspension system 24 may be pivotally supported on the vehicle chassis 16 (FIG. 1) by two pivot pins, namely an outboard pivot pin 34 and an inboard pivot pin (not shown)). The outboard pivot pin 34 is located outboard of the drive wheel 22 while the inboard pivot pin is located inboard of the drive wheel 22 and is secured on the vehicle chassis 16. In one embodiment, the outboard pivot pin 34 may be configured to be coupled between an undercarriage bearing support member 38 and one or more of the undercarriage support beams of the suspension system 24. For example, the pivot pin 34 may be configured to be received through both the bearing support member 38 and a portion of the adjacent undercarriage support beam(s). The bearing support member 38 may, in turn, be secured at each of its ends to support posts (not shown) coupled to the vehicle chassis 16. As such, the outboard pivot pin 34 may serve to pivotally couple the undercarriage support beam(s) to the chassis 16.

It should be appreciated that a similar pivotal support arrangement may also be provided on the vehicle chassis 16 inboard of the drive wheel 22 utilizing the inboard pivot pin. For example, the inboard pivot pin may be configured to be received within a suitable opening defined in the adjacent undercarriage support beam(s) for pivotally coupling the support beam(s) to the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration.

Figure 3:
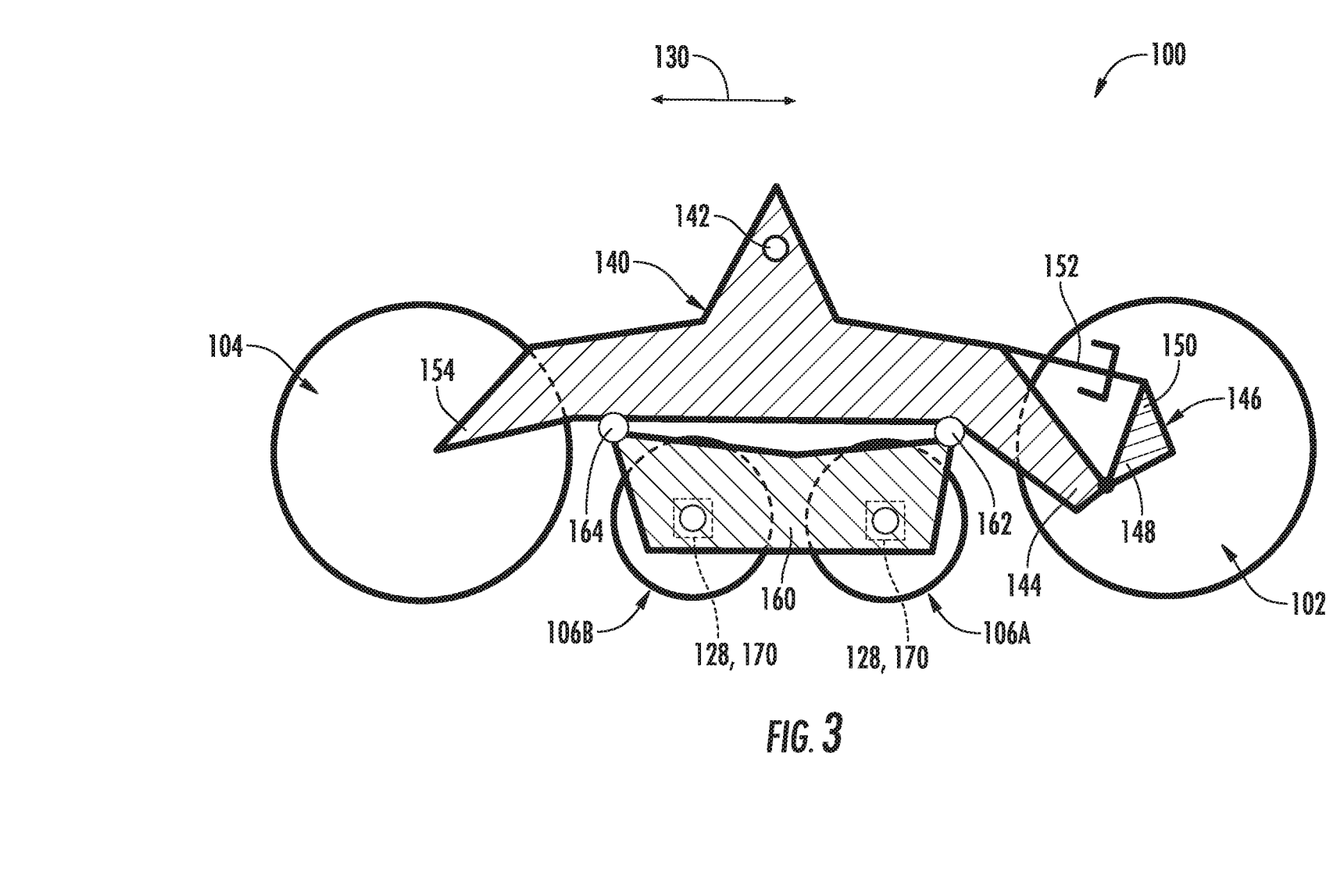
FIG. 3 illustrates a schematic, simplified side view of one embodiment of a suspension system suitable for use with a track assembly for a track-driven work vehicle in accordance with aspects of the present subject matter.
Figure 4:
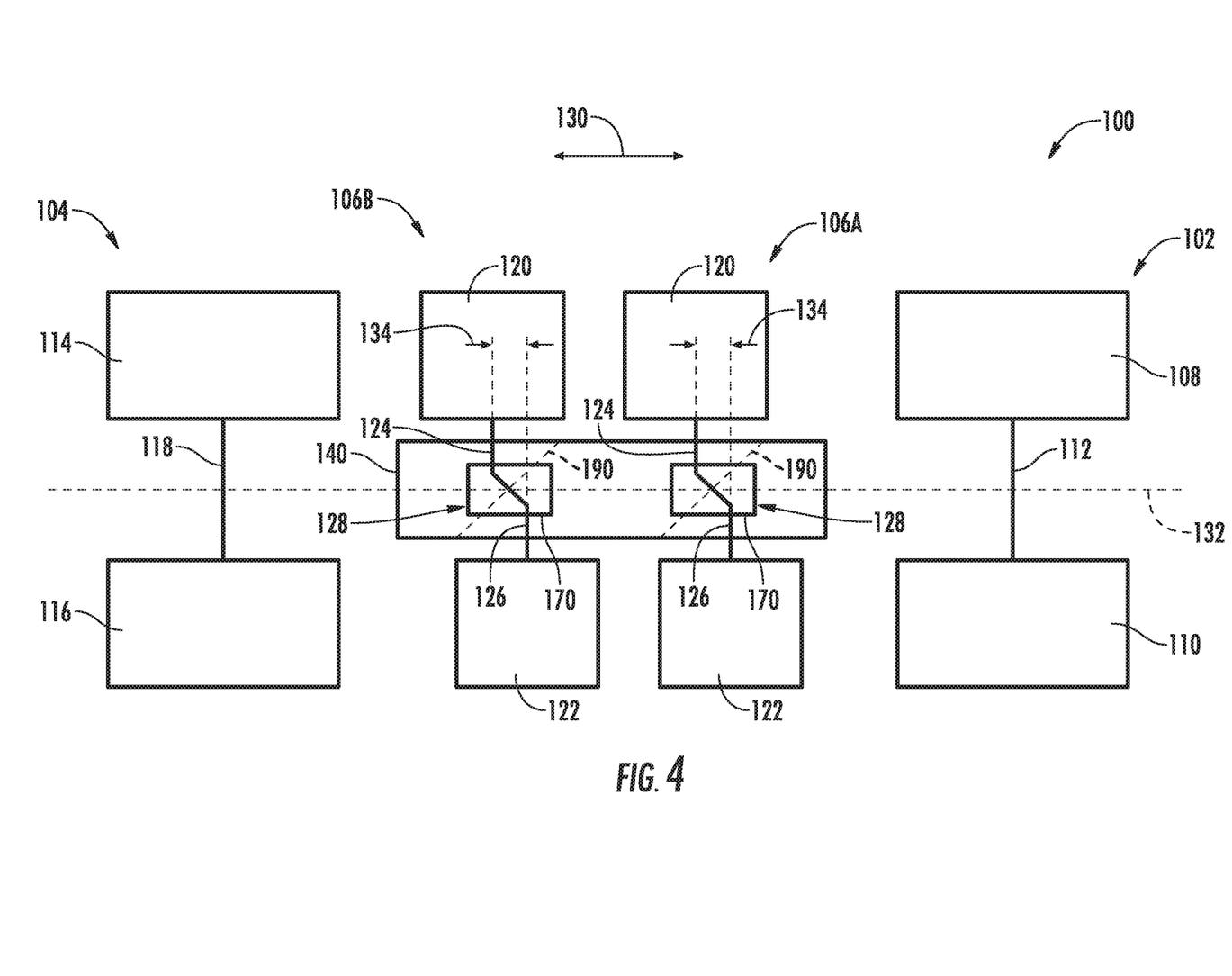
FIG. 4 illustrates a schematic, simplified bottom view of the suspension system shown in FIG. 3.

Referring now to FIGS. 3 and 4, schematic, simplified views of one embodiment of a suspension system 100 suitable for use with a track assembly for a track-driven work vehicle is illustrated in accordance with aspects of the present subject matter. Specifically, FIG. 3 illustrates a schematic side view of the suspension system 100 and FIG. 4 illustrates a schematic bottom view of the suspension system 100. The illustrated suspension system 100 may, for example, correspond to or form a replacement for the suspension system 24 described above with reference to the track assembly 12, 14 of FIG. 2. It should be appreciated that, for purposes of the description provided herein, the terms "outboard" and "inboard" are used to clarify the relationship of a given component relative to the longitudinal centerline of the associated vehicle (which generally extends parallel to the vehicle's travel direction), with an "inboard" component being located closer to the vehicle's longitudinal centerline than an "outboard" component.

In several embodiments, the suspension system 100 includes a plurality of wheel assemblies, such as a front idler wheel assembly 102, a rear idler wheel assembly 104, and one or more roller wheel assemblies 106 (e.g., a front roller wheel assembly 106A and a rear roller wheel assembly 106B). As particularly shown in FIG. 4, the front idler wheel assembly 102 includes a pair of front idler wheels (e.g., an inboard front idler wheel 108 and an outboard front idler wheel 110) and a front idler wheel shaft 112 coupled between the front idler wheels 108, 110. Additionally, the rear idler wheel assembly 104 includes a pair of rear idler wheels (e.g., an inboard rear idler wheel 114 and an outboard rear idler wheel 116) and a rear idler wheel shaft 118 coupled between the rear idler wheels 114, 116. Moreover, as shown in FIG. 4, each roller wheel assembly 106 includes a pair of roller wheels (e.g., an inboard roller wheel 120 and an outboard roller wheel 122), an inboard roller shaft 124 coupled to the inboard roller wheel 120, and an outboard roller shaft 126 coupled to the outboard roller wheel 122. As will be described below, each roller wheel assembly 106 may also include or be associated with a pivot joint 128 connecting the roller shafts 124, 126 to provide a pivot point or axis about which the roller wheels 120, 122 pivot.

As particularly shown in FIG. 4, in one embodiment, the opposed roller shafts 124, 126 of each roller assembly 106 may be offset from each other in a travel direction of the associated vehicle (indicated by arrow 130 in FIG. 4), with such travel direction 130 being oriented generally parallel to a centerline 132 of the suspension system 100 defined between the opposed pairs of inboard and outboard wheels. For instance, as shown in FIG. 4, the inboard roller shaft 124 of each roller wheel assembly 106 is offset from the associated outboard roller shaft 126 of such roller wheel assembly 106 by a given offset distance 134. Alternatively, in other embodiments, the opposed roller shafts 124, 126 of each roller assembly 106 may be aligned with each other in the travel direction 130 and/or along the centerline 132 of the suspension system 100.

It should be appreciated that, in several embodiments, the various shafts described herein may correspond to fixed or non-rotating shafts. In such an embodiment, the wheel associated with each shaft may be configured to rotate relative to such shaft as the track moves relative to the wheel in a continuous loop during operation of the work vehicle.

Additionally, as shown in FIG. 3, the suspension system 100 may include one or more support beams for supporting the various wheel assemblies 102, 104, 106. For instance, as shown in the illustrated embodiment, the suspension system 100 includes a main undercarriage support beam 140. In one embodiment, the main undercarriage support beam 140 may be configured to be pivotably coupled to the chassis of an associated vehicle. For instance, the main undercarriage support beam 140 may define openings 142 (e.g., outboard and inboard openings) for receiving suitable pivot pins for coupling the beam 140 to the vehicle's chassis, such as using the pivot pins described above with reference to FIG. 2.

As shown in FIG. 3, the front and rear idler wheel assemblies 102, 104 may be configured to be coupled to opposed ends of the main undercarriage support beam 140. For example, in one embodiment, the front idler wheel assembly 102 may be configured to be coupled to a forward end 144 of the main undercarriage support beam 140 via a corresponding pivot beam 146. Specifically, as shown in the illustrated embodiment, one end of the pivot beam 146 (e.g., a first end 148) is pivotably coupled to the forward end 144 of the main undercarriage support beam 140, while an opposed end of the pivot beam 146 (e.g., a second end 150) is pivotably coupled to a pre-loading or tensioning element of the suspension system 100 (e.g., a tensioning cylinder 152). In such an embodiment, as shown in FIG. 3, a central or intermediate portion of the pivot beam 146 defined between its opposed ends 148, 150 may be configured to be coupled to the front idler wheel assembly 102. It should be appreciated that the tensioning cylinder 152 may be coupled between the pivot beam 146 and a portion of the main undercarriage support beam 140 to allow the pre-load or tension within the track to be increased or decreased by moving the front idler wheels 108, 110 further away from or closer to, respectively, the rear idler wheels 114, 116.

Additionally, the rear idler wheel assembly 104 may be configured to be coupled to a rear end 154 of the main undercarriage support beam 140. As shown in FIG. 3, in one embodiment, the rear idler wheel assembly 104 may be coupled to the main undercarriage support beam 140 in a non-suspended or non-pivoting configuration, thereby providing a fixed positional relationship between the rear idler wheel assembly 104 and the main undercarriage support beam 140. Alternatively, the rear idler wheel assembly 104 may be coupled to the main undercarriage support beam 140 using a suspended or pivoting configuration, which may allow the rear idler wheel assembly 104 to move independent of the main undercarriage support beam 140.

Moreover, the suspension system 100 may also include one or more roller suspension beams configured to rotationally support the roller wheel assemblies 106. For instance, in the illustrated embodiment, the suspension system 100 includes a single roller beam 160 configured to support the roller wheel assemblies 106 relative to the main undercarriage support beam 140. However, in other embodiments, the suspension system 100 may include two or more roller suspension beams for suspending the roller wheel assemblies 106 relative to the main undercarriage support beam 140.

In one embodiment, the roller beam 160 may be coupled or suspended relative to the main undercarriage support beam 140 via one or more suspension elements. For instance, as schematically shown in FIG. 3, the roller beam 160 may be suspended relative to the main undercarriage support beam 140 via first and second suspension elements 162, 164 coupled between the opposed ends of the roller beam 160 and the main undercarriage support beam 140. The suspension elements 162, 164 may, for instance, correspond to any suitable damping elements, such as rubber dampers, springs, and/or the like.

As indicated above, in accordance with aspects of the present subject matter, a pivot joint 128 may be provided between the inboard and outboard roller shafts 124, 126 of each roller assembly 106, thereby allowing the opposed roller wheels 120, 122 of each roller assembly 106 to pivot about a centralized pivot axis. For example, as particularly shown in FIG. 4, each roller wheel assembly 106 may include a suitable pivot mechanism 170 supported by the roller beam 160 that pivotably connects the inboard and outboard roller shafts 124, 126 of such roller wheel assembly 106. In one embodiment, the pivot mechanism 170 may correspond to a suitable bearing or similar pivoting mechanism, such as a spherical roller bearing or a tapered roller bearing.

In one embodiment, the pivot mechanism 170 may be configured such that the roller shafts 124, 126 are configured to pivot about a pivot axis that extends generally parallel to the centerline 132 of the suspension system 100 (or parallel to the travel direction 130 of the vehicle). In such an embodiment, the pivoting action of each roller wheel assembly 106 may generally be in the vertical direction. Specifically, as one of the roller wheels moves upwardly as it passes over a bump or other surface contour change, the pivoting action provided by the associated pivot mechanism 170 allows the opposed roller wheel to be forced downwardly, thereby reducing the amount of loading on the roller wheel that is passing over the bump.

Alternatively, the pivot mechanism 170 may be configured such that the roller shafts 125, 126 are configured to pivot about a pivot axis (e.g., example axis 190 shown in FIG. 4) that is slightly offset from parallel (e.g., with respect to the centerline 132 of the suspension system 100 or the travel direction 130 of the vehicle). In such an embodiment, in addition to vertical pivoting, the pivoting action of each roller wheel assembly 106 may result in the opposed roller wheels 120, 122 pivoting slightly forward/rearward (e.g., in the travel direction 130) and slightly inward/outward (e.g., relative to the centerline 132). Such offset, non-parallel pivoting may, in certain instances, provide improved load transfer between the roller wheels 120, 122, thereby reducing the load applied on the roller wheel passing over the surface contour change and also reducing the overall amount of shock loading or vibrations transmitted from the track assembly to the vehicle's chassis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A suspension system for a track assembly of a track-driven work vehicle, the suspension system comprising:
    a roller beam; and
    at least one roller wheel assembly coupled to the roller beam, the at least one roller wheel assembly comprising:
        an inboard roller shaft and an inboard roller wheel coupled to the inboard roller shaft;
        an outboard roller shaft and an outboard roller wheel coupled to the outboard roller shaft; and
        a pivot mechanism coupling the inboard roller shaft to the outboard roller shaft,
    wherein the inboard and outboard roller shafts are offset from each other in a travel direction of the work vehicle such that an offset distance is defined in the travel direction between a location at which the inboard roller shaft couples to the pivot mechanism and a location at which the outboard roller shaft couples to the pivot mechanism.

2. The suspension system of claim 1, wherein the pivot mechanism defines a pivot axis about which the inboard and outboard roller shafts pivot.

3. The suspension system of claim 2, wherein the pivot axis extends parallel to a longitudinal centerline of the suspension system.

4. The suspension system of claim 2, wherein the pivot axis is offset from parallel relative to a longitudinal centerline of the suspension system.

5. The suspension system of claim 1, wherein the inboard and outboard roller shafts are pivotably coupled to the pivot mechanism such that vertical movement of one of the inboard roller wheel or the outboard roller wheel results in opposed vertical movement of the other of the inboard roller wheel or the outboard roller wheel.

6. The suspension system of claim 5, wherein the inboard and outboard roller shafts are pivotably coupled to the pivot mechanism such that forward movement of one of the inboard roller wheel or the outboard roller wheel results in rearward movement of the other of the inboard roller wheel or the outboard roller wheel.

7. The suspension system of claim 1, wherein the pivot mechanism comprises a spherical roller bearing or a tapered roller bearing.

8. The suspension system of claim 1, further comprising:
    a main undercarriage support beam; and front and rear idler wheel assemblies coupled to opposed ends of the main undercarriage support beam;

wherein the roller beam is suspended relative to the main undercarriage support beam between the front and rear idler wheel assemblies.

9. The suspension system of claim 8, wherein the roller beam is suspended relative to the main undercarriage support beam via one or more suspension elements.

10. A track assembly of a track-driven work vehicle, the track assembly comprising:
 a track;
 a drive wheel configured to engage the track;
 front and rear idler wheels around which the track is wrapped;
 a main undercarriage support beam relative to which the front and rear idler wheels are supported;
 a roller beam suspended relative to the main undercarriage support beam; and
 at least one roller wheel assembly coupled to the roller beam, the at least one roller wheel assembly comprising:
  an inboard roller shaft and an inboard roller wheel coupled to the inboard roller shaft;
  an outboard roller shaft and an outboard roller wheel coupled to the outboard roller shaft; and
  a pivot mechanism coupling the inboard roller shaft to the outboard roller shaft;
 wherein the pivot mechanism defines a pivot axis about which the inboard and outboard roller shafts pivot; and
 wherein the inboard and outboard roller shafts are offset from each other in a travel direction of the work vehicle such that an offset distance is defined in the travel direction between a location at which the inboard roller shaft couples to the pivot mechanism and a location at which the outboard roller shaft couples to the pivot mechanism.

11. The track assembly of claim 10, wherein the pivot axis extends parallel to the travel direction of the work vehicle.

12. The track assembly of claim 10, wherein the pivot axis is offset from parallel relative to the travel direction of the work vehicle.

13. The track assembly of claim 10, wherein the inboard and outboard roller shafts are pivotably coupled to the pivot mechanism such that vertical movement of one of the inboard roller wheel or the outboard roller wheel results in opposed vertical movement of the other of the inboard roller wheel or the outboard roller wheel.

14. The track assembly of claim 13, wherein the inboard and outboard roller shafts are pivotably coupled to the pivot mechanism such that forward movement of one of the inboard roller wheel or the outboard roller wheel results in rearward movement of the other of the inboard roller wheel or the outboard roller wheel.

15. The track assembly of claim 10, wherein the pivot mechanism comprises a spherical roller bearing or a tapered roller bearing.

16. The track assembly of claim 10, wherein the roller beam is suspended relative to the main undercarriage support beam via one or more suspension elements.

17. A track-driven work vehicle, comprising:
 a chassis; and
 a track assembly supported relative to the chassis, the track assembly comprising:
  a track;
  a drive wheel configured to engage the track;
  a main undercarriage support beam coupled to the chassis;
  front and rear idler wheel assemblies coupled to opposed ends of the main undercarriage support beam;
  a roller beam suspended relative to the main undercarriage support beam; and
  at least one roller wheel assembly coupled to the roller beam, the at least one roller wheel assembly comprising:
   an inboard roller shaft and an inboard roller wheel coupled to the inboard roller shaft;
   an outboard roller shaft and an outboard roller wheel coupled to the outboard roller shaft; and
   a pivot mechanism coupling the inboard roller shaft to the outboard roller shaft,
  wherein the inboard and outboard roller shafts are offset from each other in a travel direction of the work vehicle such that an offset distance is defined in the travel direction between a location at which the inboard roller shaft couples to the pivot mechanism and a location at which the outboard roller shaft couples to the pivot mechanism.

18. The work vehicle of claim 17, wherein the pivot mechanism defines a pivot axis about which the inboard and outboard roller shafts pivot.

* * * * *